United States Patent
Undrum et al.

(10) Patent No.: US 11,773,273 B2
(45) Date of Patent: Oct. 3, 2023

(54) AQUEOUS PRIMER

(71) Applicant: JOTUN A/S, Sandefjord (NO)

(72) Inventors: Håvard Undrum, Sandefjord (NO); Thor Håkon Krane Thvedt, Sandefjord (NO)

(73) Assignee: JOTUN A/S, Sandefjord (NO)

( * ) Notice: Subject to any disclaimer, the term of this patent is extended or adjusted under 35 U.S.C. 154(b) by 772 days.

(21) Appl. No.: 16/633,817

(22) PCT Filed: Jul. 25, 2018

(86) PCT No.: PCT/EP2018/070216
§ 371 (c)(1),
(2) Date: Jan. 24, 2020

(87) PCT Pub. No.: WO2019/020709
PCT Pub. Date: Jan. 31, 2019

(65) Prior Publication Data
US 2020/0181420 A1   Jun. 11, 2020

(30) Foreign Application Priority Data
Jul. 25, 2017   (EP) .................... 17183163

(51) Int. Cl.
C09D 5/00 (2006.01)
C08K 3/011 (2018.01)
C08G 77/14 (2006.01)
C08G 77/26 (2006.01)
C08K 3/08 (2006.01)
C08K 3/22 (2006.01)
C08K 3/32 (2006.01)
C08K 5/098 (2006.01)
C09D 5/02 (2006.01)
C09D 183/06 (2006.01)
C09D 183/08 (2006.01)

(52) U.S. Cl.
CPC ............. *C09D 5/002* (2013.01); *C08G 77/14* (2013.01); *C08G 77/26* (2013.01); *C08K 3/011* (2018.01); *C08K 3/08* (2013.01); *C08K 3/22* (2013.01); *C08K 3/32* (2013.01); *C08K 5/098* (2013.01); *C09D 5/028* (2013.01); *C09D 183/06* (2013.01); *C09D 183/08* (2013.01); C08K 2003/0893 (2013.01); C08K 2003/2241 (2013.01); C08K 2003/2296 (2013.01); C08K 2003/321 (2013.01)

(58) Field of Classification Search
CPC ...... C09D 5/002; C09D 5/028; C09D 183/06; C08K 3/011; C08K 3/08; C08K 3/22; C08K 5/098; C08K 2003/0893; C08K 2003/2241; C08K 2003/2296; C08K 2003/321; C08G 77/14; C08G 77/26
USPC ...................................... 106/287.1
See application file for complete search history.

(56) References Cited

U.S. PATENT DOCUMENTS

| 5,580,371 A | 12/1996 | Falberg |
| 6,468,336 B1 | 10/2002 | Fielder et al. |
| 2010/0139525 A1 | 6/2010 | Kolberg et al. |
| 2011/0268899 A1 | 11/2011 | Albert et al. |
| 2012/0204762 A1* | 8/2012 | Albert .................. C09D 183/06 106/287.11 |
| 2014/0106176 A1 | 4/2014 | Albert et al. |

FOREIGN PATENT DOCUMENTS

| EP | 1191074 A1 | 3/2002 |
| GB | 201203711 | 9/2013 |
| RU | 2304156 C1 | 8/2007 |
| RU | 2008134890 A | 3/2010 |
| WO | 2007111769 A | 10/2007 |
| WO | 2017129784 A1 | 8/2017 |

OTHER PUBLICATIONS

International Search Report and Written Opinion in PCT/EP2018/070216, dated Oct. 1, 2018. 11 pages.

* cited by examiner

*Primary Examiner* — Ling Siu Choi
*Assistant Examiner* — Ronald Grinsted
(74) *Attorney, Agent, or Firm* — Meunier Carlin & Curfman LLC

(57) ABSTRACT

The present invention relates to an aqueous primer comprising: (A) a polysiloxanesol; and (B) 0.1 to 30 wt % of a water-soluble zinc salt having a solubility in deionised water of at least 0.5 g/L at 25° C.

19 Claims, No Drawings

AQUEOUS PRIMER

CROSS-REFERENCE TO RELATED APPLICATIONS

This application is a national stage application filed under 35 U.S.C. § 371 of PCT/EP2018/070216, filed Jul. 25, 2018, which claims the benefit of priority to European Patent Application No. 17183163.9, filed Jul. 25, 2017, the contents of each are incorporated herein by reference in their entireties.

This invention relates to a new primer composition for application to substrates such as steel. In particular, the invention relates to a primer composition comprising a polysiloxane sol, a water-soluble zinc salt and an anti-corrosive pigment. The primer of the invention is fast curing, abrasion resistant, has a low volatile organic content (VOC) and, most importantly, has early water resistance. In addition, the primer preferably has good anticorrosive properties, fast curing, low VOC and good abrasion resistance. Shop primers are preferred. The primer can also be overcoated with further coating layers, without extensive pretreatment and without loss of intercoat adhesion.

BACKGROUND

Organic solvent based primer coating systems are known. However, with ever-increasing environmental awareness, there is a strong desire to develop improved technology that would allow the use of water-based coating systems as primers and avoid organic solvent based solutions. In this regard, a leading water born primer technology is based on alkali metal silicates.

Falberg (U.S. Pat. No. 5,580,371) has proposed an example of a zinc-containing primer that provides a durable, corrosion-resistant coating, combined with suitable weldability. The primer comprises zinc, iron phosphide and an aqueous potassium silicate solution.

More recently, U.S. Pat. No. 6,468,336 proposes a silicate based shop primer comprising zinc, micaceous iron oxide and the silicate.

Water borne shop primers based on alkali silicate binders are therefore well known in the market today, and they typically possess many of the vital features required of a primer, especially a shop primer, e.g. in terms of low volatile content, quick drying time, weldability and so on. However, alkali metal silicate based water borne shop primers suffer from one major problem. Alkali metal silicate shop primers are based on sodium, potassium or lithium silicate binders which, in aqueous solution, are very high in pH, usually in the range of pH 11-12. High pH on the surface of the substrate will cause the next coating, usually an epoxy type of paint, to lose adhesion and blister when the system is exposed to water. Any steel primed with an alkali silicate shop primer has to either be removed completely or thoroughly washed repeatedly with fresh water before over coating to circumvent said issues.

Furthermore, alkali silicates require specialised production equipment and application equipment where all parts in contact with the wet paint have to be made out of non-metal materials.

There is a significant need therefore to develop new primers that are water borne but do not rely on alkali metal silicates.

It is particularly desirable to provide a primer which meets these requirements whilst also being quick drying even under conditions of high humidity. In some environments it may be unavoidable that article having the primer applied thereon is exposed to an area of high humidity.

The present inventors have devised a water borne primer with very low VOC, that is water thinnable and that dries quickly to give water resistance. An additional benefit is that the invention offers a shop primer which has excellent weldability producing a minimum of pores, weld spatter and weld smoke, has excellent abrasion resistance and can be directly over coated with most paints. The primer also resists weathering, water, chemicals and solvents and can be applied by conventional equipment such as via airless spray.

The primer is based on an aqueous polysiloxane binder in conjunction with a water-soluble zinc salt and may also include an anti-corrosive pigment. It has been surprisingly found that the specific combination of components described in claim 1 gives rise to a composition that meets all the requirements for a primer, especially a shop primer, in particular in terms of drying time, water and chemical resistance, abrasion resistance and which allows overcoating with new paint layers without the need to remove or repeatedly wash the primer.

The polysiloxane binder of use in the primer of the invention is not new and is described, inter alia, in US2011/0268899 and US2014/0106176. These documents however, primarily consider the structure of the binder rather than target particular primer compositions that perform advantageously. The present inventors supplement the knowledge in these documents by identifying particular primers that are remarkably useful in the art, particularly as shop primers.

It is appreciated that some compounds such as zinc oxide are sometimes added to primers as corrosion inhibitors. The appreciation that the addition of certain water-soluble zinc salts leads to, inter alia, rapid drying and advantageous overcoating, is new. Fast drying may be combined with the use of microspheres to improve hardness and reduce pore formation and back burning.

The invention in particular relates to shop primers. Shipping containers and other marine metal objects are typically assembled by welding together a number of individual metal components. In marine and industrial construction, it is usually desirable to pre-paint steel with a zinc-containing primer before fabrication, and many such coating compositions, known as shop primers or pre-construction primers, are known. To prevent corrosion during welding, the components are surface prepared (e.g. cleaned and roughened by, for example, shot-blasting) and then coated with shop primer compositions that provide temporary corrosion protection. Such compositions allow primed components to be welded through the shop primer layer without having to remove the primer coating near the weld.

After welding, the primer coating may be over-coated with a further primer layer and optionally, a topcoat to provide extended corrosion protection and the desired aesthetic appearance.

Shop primers can be organic or inorganic and can be supplied in water or in organic solvent. Some shop primer compositions include zinc powder in an organic resin such as an epoxy resin, an epoxy ester, a polyurethane, a polystyrene resin or a silicone resin. Coatings based on these organic binders are not well suited for coating steel that must ultimately be welded because the binder tends to decompose from the heat of the weld, resulting in pores in the weld seams. Primers according to the present invention may be particularly suitable as shop primers.

US2012/0204762 describes aqueous silane-based compositions comprising metal salts, which offer corrosion protection when applied as a coating to metal substrates. The coatings are exemplified by silane-based compositions comprising 0.5 wt % Cr(III) nitrate, Al(III) nitrate or Ce(III) nitrate, which are used to coat galvanized steel panels. Panels coated with the coating compositions comprising a metal salt showed greater corrosion resistance after treatment with salt spray mist compared to panels which were not treated, or compared to panels which were treated with a silane-based coating without a metal salt. US2012/0204762 does not exemplify silane compositions comprising Zn(II) salts, nor does it describe the suitability of the silane-based compositions as shop primers.

SUMMARY OF INVENTION

Thus, viewed from one aspect the invention provides an aqueous primer comprising:
(A) a polysiloxane sol; and
(B) 0.1 to 30 wt % of a water-soluble zinc salt having a solubility in deionised water of at least 0.5 g/L at 25° C.

In some embodiments the primer comprises 0 to 95 wt % of at least one anticorrosive pigment (C), preferably 15 to 45 wt %.

Viewed from another aspect the invention provides an aqueous primer comprising:
(A) a polysiloxane sol;
(B) 0.1 to 30 wt % of a water-soluble zinc salt having a solubility in deionised water of at least 0.5 g/L at 25° C.;
(C) 15 to 90 wt % of at least one anticorrosive pigment; and
(D) 0.5 to 20 wt % of an accelerator selected from zinc oxide, zinc phosphate, calcium strontium zinc phosphosilicate, zirconium hydrogen phosphate, iron phosphide, calcium zirconate, barium zirconate, zirconium nitride, zinc titanate or iron (II) titanate or mixtures thereof.

Viewed from another aspect the invention provides a kit comprising at least two parts; a first Component (I) comprising component (A) as hereinbefore defined and a second Component (II) comprising component (B) and/or component (C) as hereinbefore defined. The parts of the kit are mixed shortly before application to a substrate. It will be appreciated that the components (I) and (II), and where applicable (III), will be supplied separately for mixing.

Viewed from another aspect the invention provides a process for protecting a substrate from corrosion comprising applying to that substrate a primer composition as hereinbefore defined and allowing said primer to cure on said substrate.

Viewed from another aspect the invention provides a substrate coated with a cured primer composition as hereinbefore defined.

Viewed from another aspect the invention provides the use of a primer as hereinbefore defined to provide temporary corrosion protection to a substrate.

DETAILED DESCRIPTION OF INVENTION

The present invention relates to a primer composition which is suitable for application to a substrate to provide temporary corrosive protection to said substrate. The primers of the invention can be applied by spraying and possess low VOC and can be thinned with water to achieve an ideal application viscosity. Nevertheless, the primers are fast drying and rapidly are able to withstand mechanical abrasion and treatment with chemicals, water and the like. The primers of the invention may be shop primers and are weldable producing a minimum of weld pores, weld spatter, weld smoke and back burning. Finally, as well as being corrosion resistant, the primers are capable of being overcoated with most types of paint without any extra pretreatment of the primer coat (other than cleaning to remove detritus such as dust, salt and/or grease that have been acquired after primer application and prior to applying the next coat).

The primer of the invention contains at least one polysiloxane sol component A.

Binder—Component (A)

The primer of the invention composition of the invention contains a polysiloxane sol component (also known as the binder component) that is capable of curing upon application of the coating composition to a substrate, typically a steel substrate. The polysiloxane sol component is a component formed by the condensation reaction of at least one silane to form a highly branched polysiloxane sol which contains a plurality of free silanol functionalities. When this sol is combined with the other components of the coating composition, and applied to a substrate, a coating is formed and the free silanol groups present in the sol form links to groups present on a substrate surface. This curing reaction takes place spontaneously at room temperature to form the primer.

The polysiloxane sol is explicitly a sol rather than a gel. It can be regarded as a solution, a colloidal solution, an emulsion or a suspension. The polysiloxane is therefore present in an aqueous form before application. The polysiloxane gels during the curing process upon mixing with the other components of the primer.

The polysiloxane sol of the present invention is ideally derived from at least one alkoxysilane precursor that has been subjected to hydrolysis to form the corresponding silanol. It will be appreciated that in many alkoxysilanes there are multiple alkoxy groups (typically up to three such groups) and hence there are multiple hydrolysis products possible depending on the hydrolysis procedure. Fully hydrolysed and partially hydrolysed products can be formed. This hydrolysis reaction results in the formation of alcohol.

The hydrolysed silanes/partially hydrolysed silanes can then be condensed together as is well known to form complex oligomers/polymers. Due to the various different monomers present when a hydrolysis reaction is effected, a complex polysiloxane sol forms which cannot be easily characterised by a general formula. For example, due to partial hydrolysis, two partially hydrolyzed molecules can link together in a condensation reaction to form a siloxane and so on. This condensation process obviously causes the formation of alcohol and water by products.

Thus, condensation is associated with the formation of a 2, or 3-dimensional network of siloxane [Si—O—Si] bonds accompanied by the production of water and alcohol species.

The polysiloxane sol of the present invention is typically provided in aqueous form in component (A). Moreover, it is preferably essentially VOC free (volatile organic compounds). It is easy therefore to remove the formed alcohols by evaporation during sol formation. Importantly, as the sol presents with free silanol groups, no further alcohol is liberated on curing keeping VOC content low.

The sol is preferably room temperature curable.

It is preferred if the polysiloxane sol of the invention is based upon the condensation of at least one bis-amino functional alkoxysilane which is subject to hydrolysis or epoxyfunctional alkoxysilane which is subject to hydrolysis. Surprisingly, it was found that stable aqueous, substantially alcohol-free compositions based on silicon compounds can be obtained from bis-amino functional alkoxysilanes or epoxyfunctional alkoxysilane optionally together with organofunctional alkoxysilanes. In particular, the sol gel chemistry relies on bis-amino functional alkoxysilanes or epoxyfunctional alkoxysilanes together with alkyl-functional alkoxysilanes. The silane compounds are ideally present in substantially completely hydrolyzed form but partially hydrolysed form is also possible. These compositions crosslink at low temperatures.

Thus, the polysiloxane sol materials of the present invention are preferably based on condensates of bis-aminofunctional alkoxysilanes, such as bis(triethoxysilane)amine or bis(trimethoxysilane)amine. These monomers can be subject to hydrolysis to obtain fully or partially hydrolysed analogues of bis-amino functional alkoxysilanes, such as bis (triethoxysilane)amine or bis(trimethoxysilane)amine. Epoxyfunctional alkoxysilanes can be subject to hydrolysis to obtain fully or partially hydrolysed analogues as well. Such silanes include 3-glycidyloxypropyltriethoxysilane (GLYEO), 3-glycidyloxypropyltrimethoxysilane (GLYMO).

These treated monomers may be used alone or combined with other monomers to form the sol. Other preferred monomers include bis(triethoxysilane)amine, bis(trimethoxysilane)amine, n-propyltriethoxysilane, n-propyltrimethoxysilane (PTMO), 3-glycidyloxypropyltriethoxysilane (GLYEO), 3-glycidyloxypropyltrimethoxysilane (GLYMO), 3-aminopropyltriethoxysilane (AMEO), 3-aminopropyltrimethoxysilane (AMMO), methacryloxypropyltriethoxysilane (MEEO), methacryloxypropyltrimethoxysilane (MEMO), N-(n-butyl)-3-aminopropyltriethoxysilane, vinyltrimethoxysilane (VTMO), N-(n-butyl)-3-aminopropyltrimethoxysilane (Dynasylan(R) 1189), 3-mercaptopropyltrimethoxysilane (MTMO), 3-mercaptopropyltriethoxysilane (MTEO), N-2-aminoethyl-3-aminopropyltrimethoxysilanes (DAMO), polyethylene glycol-functionalized alkoxysilanes, tetraethoxysilane (Dynasylan A), tetramethoxysilane (Dynasylan M), methyltriethoxysilane (MTES), methyltrimethoxysilane (MTMS), bis(triethoxysilylpropyl)tetrasulfane (Si 69), bis(triethoxysilylpropyl)disulfane (Si 266), bis (trimethoxysilylpropyl)disulfane, bis(trimethoxysilylpropyl)tetrasulfane, vinyltriethoxysilane (VTEO), 1-aminomethyltriethoxysilyne, 1-aminomethyltrimethoxysilyne, 1-methacryloxymethyltrimethoxysilane, 1-methacryloxymethyltriethoxysilane, 1-mercaptomethyltriethoxysilane, 1-mercaptomethyltrimethoxysilane, isobutyltrimethoxysilane, isobutyltriethoxysilane, octyltriethoxysilane (Dynasylan(R) OTEO), octyltrimethoxysilane, hexadecyltriethoxysilane, hexadecyltrimethoxysilane, phenyltrimethoxysilane, phenyltriethoxysilane, 2-aminoethyl-3-aminopropylmethyldimethoxysilanes, 2-aminoethyl-3-aminopropylmethyldiethoxysilanes, ureidopropyltrimethoxysilane, ureidopropyltriethoxysilane, tridecafluorooctyltriethoxysilane, tridecafluorooctyltrimethoxysilane, Dynasylan(R) 1151 (alcohol-free aminosilane hydrolysis product), Dynasylan(R) HS 2627 (alcohol-free cocondensate of aminosilane and alkylsilane), Dynasylan(R) HS 2776 (aqueous, alcohol-free cocondensate of diaminosilane and alkylsilane), Dynasylan (R) HS 2909 (aqueous, alcohol-free cocondensate of aminosilane and alkylsilane), Dynasylan(R) HS 2926 (aqueous, alcohol-free product based on epoxysilane), and Dynasylan (R) SIVO 110 (aqueous, alcohol-free product of epoxysilane).

Any of these monomers can also be subjected to hydrolysis to generate hydrolysed or partially hydrolysed monomers for reaction with the bis-amino functional alkoxysilanes or epoxyfunctional alkoxysilanes, which may also be hydrolysed or partially hydrolysed. The use of a hydrolysed bis-amino functional alkoxysilanes or epoxyfunctional alkoxysilanes along with a non-hydrolysed alkyl alkoxysilane monomer is preferred. A further preferred option is epoxyfunctional alkoxysilanes in combination with aminofunctionalalkoxysilanes.

Epoxyfunctional alkoxysilanes of use in the invention are most preferably epoxyalkylfunctional alkoxysilanes.

The use of epoxyfunctional alkoxysilanes is especially preferred as starting materials for sol formation. Any alkoxy group in the polysiloxane sol of the invention will preferably have C1-6 carbon atoms, such as C1-4 carbon atoms, especially C1-3 carbon atoms, e.g. methyl, ethyl, n-propyl, i-propyl or n-butyl.

In a most preferred embodiment the sol is formed from a co-condensate based on an ω-glycidyloxyalkylalkoxysilane of formula I

$$X—Si(R)_x(OR^1)_{3-x} \quad (I),$$

wherein X is a 2-(3,4-epoxycyclohexyl)ethyl, 1-glycidyloxymethyl, 2-glycidyloxyethyl, 3-glycidyloxypropyl or 3-glycidyloxyisobutyl group, $R^1$ and R each independently are a linear or branched alkyl group comprising from 1 to 4 C atoms; and x is 0 or 1, or is a bis(alkoxysilylalkyl)amine of formula II

$$(OR^1)_3Si—A—Si(OR^1)_3 \quad (II),$$

wherein each $R^1$ independently is a linear or branched alkyl group comprising from 1 to 4 C atoms and A is a bis-amino-functional group of formula IIa

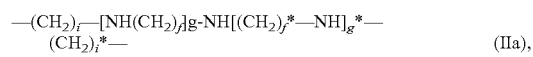

$$—(CH_2)_i—[NH(CH_2)_j]_g—NH[(CH_2)_f^*—NH]_{g^*}— (CH_2)_{i^*}^*— \quad (IIa),$$

wherein i and i* each independently are an integer of 1, 2, 3 or 4, f and each independently are an integer of 1 or 2, and g and g* each independently are an integer of 0 or 1.

To prevent any VOC content alcohol liberated during sol gel formation is distilled off.

Hydrolysis of the starting alkoxysilanes can be effected using formic acid or other mild hydrolysing agent, e.g. as shown in US2011/0268899. The condensation reaction is preferably effected at low pH e.g. less than 7, such as 3 to 5. The reaction time is preferably controlled to ensure formation of a sol rather than a gel. Reaction times might be up to 3 hrs. Too long reaction times may allow a curing reaction to begin. The synthesis of the necessary sol is summarised in US2011/0268899 or US2014/0106176.

Viewed therefore from another aspect the polysiloxane sol of use in the invention is one that is obtainable by a process comprising:
(i) hydrolysing at least one bisamino functional alkoxysilane or epoxyfunctional alkoxysilanes;
(ii) reacting the resulting hydrolysed product with at least one optionally hydrolysed alkylalkoxysilane.

Any alcohol formed can be removed so that the alcohol content of the sol is less than 3 wt %.

Alternatively viewed, the polysiloxane sol of use in the invention is one that is obtainable by a process comprising hydrolysing a bisamino functional alkoxysilane or epoxyfunctional alkoxysilane and allowing the resulting hydrolysed product to self condense to form a sol. Any alcohol formed can be removed so that the alcohol content of the sol is less than 3 wt %.

It will be appreciated that more complex sols can be prepared by adding further reactants into the mix. Whilst therefore there must be at least one bisaminoalkoxysilane or epoxyfunctional alkoxysilane reactant as hereinbefore defined, other possible reactants include vinylsilanes, alkyl-silanes, alkoxysilanes and so on.

The ratio of bis-amino functional alkoxysilanes or epoxyfunctional alkoxysilanes to alkyl alkoxysilanes may be 10:1 to 1:10, such as 5:1 to 1:5 by wt.

The formed sol should be dispersible in water at room temperature of 23'C. By water dispersible is meant that the sol may form an emulsion, suspension or colloidal solution in water.

It is important that the sol has free silanol groups so that on curing, no further alcohol is released thereby keeping VOC levels low.

Whilst the sols of the invention are provided in water, the polysiloxanes are often diluted with water before use to achieve an ideal application viscosity. Notably, commercially available polysiloxanes of use in this invention are available as aqueous solutions.

The polysiloxane sol (i.e. including the weight of any water in the primer) may form 10 to 80 wt % of the primer, preferably 25 to 80 wt %, such as 25 to 70 wt %, preferably 35 to 65 wt %.

Preferably, the amount of water present in the primer of the invention is 10 to 65 wt %, such as 20 to 65 wt % water. The polysiloxane sol component A typically contains 50 to 98 wt % water, such as 65 to 95 wt % water. Often the solids content of the polysiloxane sol is 2 to 35% by weight, preferably 5 to 30% by weight. Solids content of the sol is especially 10 to 25 wt %. The sol, which may be purchased from a supplier, may however be diluted by the user as necessary.

The water used for dilution is preferably deionized water. Any water used for dilution is, for wt percentage terms, regarded as part of the polysiloxane sol herein. Whenever percentages of sol are presented in the text, that refers to the weight of sol and water total in the primer.

The condensation products formed by the reaction of, inter alia, bis-amino functional alkoxysilanes or epoxyfunctional alkoxysilanes and alkyl alkoxysilanes may be oligo/polymeric. Both are termed a polysiloxane herein. They may have a particle size between 0.5 and 350 nm, or preferably between 0.5 to 130 nm. The weight average molecular weight may range from 1000-150000 g/mol, preferably between 4000 to 30000 g/mol, more preferably between 1000 to 50000 g/mol, even more preferably between 1000 to 5000 g/mol. The viscosity of the polysiloxane (in water) may be 5 to 20 mPa s at 20° C.

The polysiloxane component is preferably VOC (volatile organic compounds) free. This means that it contains less than 3 wt % volatile organic compounds (according to ASTM D5201), such as 2 wt % or less, ideally 1 wt % or less. Alternatively, in contains 100 g/L VOCs or less, preferably 40 g/L of VOCs or less.

A polysiloxane sol should not release further alcohol on crosslinking Curing of the sol should be possible at temperatures which might be experienced where the substrate is coated, such as 0 to 40° C.

The polysiloxane sol preferably has a pH of 1.0 to 8.0, such as 3.0 to 5.5. The silane may have a pH range of 3.2-4.0.

The formation of the sol generates cross-linked structural elements, which are chain like, cyclic, or 3D but the structures are difficult to define via way of general formula due to the number of potential structures that form.

The polysiloxane of use in the invention is not new and these can be purchased from commercial sources. In particular, a polysiloxane of interest in the invention is available under the trade name Dynosylan Sivo 165. The material is available from Evonik. It is described as an almost VOC-free waterborne organic-inorganic (hybrid) sol-gel system that cures at relatively low temperature.

The volumetric median particle size is preferably 2 to 10 nm, such as 5.4 nm.

Defining the content of the polysiloxane sol in the primer of the invention is difficult as the amounts vary depending on the water content and on the content of anticorrosive material (it is heavy and therefore takes a disproportionate percentage of the weight of the primer). The solid binder (i.e. the weight of polysiloxane solids ignoring water) may form 1 to 35 wt %, such as 2 to 30 wt %, especially 2 to 20 dry wt % of the primer. More especially, solids content in the primer for the polysiloxane is 2 to 12 wt %, especially 4 to 10 wt %. These percentages refer to the amount of polysiloxane calculated as the total of all of the components mixed but ignoring the weight of water (dry weight).

Any "dry weight" percentage in the text/claims refers to weight percentages determined ignoring the contribution of water present. If not explicitly specified as "dry weight" a weight percentage quoted in the text/claims relates to the primer including any water content, unless context permits otherwise.

Component (A) is present in kit component (I), preferably only in kit component (I).

Water-Soluble Zinc Salt—Component B

The presence of a water-soluble zinc salt is essential for providing the primer composition with the necessary quick drying time and water resistance. The water-soluble zinc salt is one having a solubility in deionised water of at least 0.5 g/L at 25° C., preferably at least 5.0 g/L, such as at least 10 g/L or at least 20 g/L. More preferably, the water solubility should be at least 50 g/L. For the avoidance of any doubt, as used herein a solubility of, for instance, 10 g/L means that the solubility of the salt is 10 g of salt in 1000 g of water at 25° C.

Preferred zinc salts according to the invention include organic zinc salts. Typically, the salt will have a relatively low molecular weight such as up to 600 g/mol. Suitable salts include as zinc butyrate, acetate, gluconate, glycerate, glycolate, lactate, propionate, salicylate, citrate, oleate, benzoate, laurate, tartrate, stearate, valerate, formate, picolinate, ascorbate, bisglycinate, lysinate, malate, mono-L-methionine sulphate, pidolate and mixtures thereof.

In some embodiments the zinc salt may be a hydrate, for example zinc gluconate dihydrate or zinc citrate trihydrate.

Inorganic zinc salts may also be used such as zinc sulphate or zinc halides. A hygroscopic zinc salt, may be used but should not be present in the same component of the kit as the anticorrosive pigment (C). Thus, where a hygroscopic zinc salt is used this is preferably either added to the sol as part of component (I) (with the anticorrosive pigment (C) present as a separate component), or preferably each of the components (A), (B) and (C) are present in separate components of the kit (Components (I), (II) and (III)).

If zinc chloride is used as the zinc salt then each of the sol, zinc salt, and if present the anticorrosive pigment should be provided as separate components of the kit. It is preferred however if Zn halides are absent from the primer.

It is preferred if the zinc salt is organic. It is preferred if the organic anion comprises at least two carboxyl groups or contains at least one carboxyl group and at least one hydroxyl group.

In the kits according to the invention, the zinc salt may be included as part of kit Component (I) and/or kit Component (II), preferably in only one of the components. It is most preferred that the zinc salt is present in kit Component (II), i.e. separate from the sol (A).

Where the zinc salt used is a hydrate or is hygroscopic it is preferred that the zinc salt is not present in the same component of the kit as the anticorrosive pigment (C). Thus, where a hydrate or hygroscopic zinc salt is used this is preferably either added to the sol as part of component (I) (with the anticorrosive pigment (C) present as a separate component), or each of the components (A), (B) and (C) are present in separate components of the kit (Components (I), (II) and (III)).

Where the zinc salt used is not a hydrate or hygroscopic, the zinc salt may be present in either kit Component (I) and/or kit Component (II). The zinc salt is most preferably present in kit Component (II), preferably only in kit Component (II). Where the zinc salt used is not a hydrate or hygroscopic, the zinc salt may be present in the same component of the kit as the anticorrosive pigment (C) (i.e. Component (II)). Alternatively, each of the components (A), (B) and (C) may be present in separate components of the kit (Components (I), (II) and (III)).

Particularly preferred salts are zinc gluconate, zinc lactate and zinc citrate, and the respective hydrates thereof. Especially preferred are zinc gluconate and zinc citrate.

Mixtures of zinc salts can also be used.

In a preferred aspect component (B) does not include zinc nitrate or zinc acetate. This means that the composition comprises less than 0.1 wt % of each of zinc nitrate or zinc acetate, preferably less than 0.05 wt % of each of zinc nitrate or zinc acetate, preferably no zinc nitrate or zinc acetate.

In a preferred aspect component (B) consists essentially of, or consists of, zinc gluconate, zinc citrate, zinc chloride, zinc acetate, or mixtures thereof. It is preferred that component (B) consists essentially of, or consists of, zinc gluconate, zinc citrate, zinc chloride, or mixtures thereof. It is further preferred that component (B) consists essentially of, or consists of, zinc gluconate, zinc citrate, or mixtures thereof.

The zinc salt component (B) forms 0.1 to 30 wt % of the primer as a whole, preferably 0.1 to 10 wt %, preferably 0.1 to 5 wt %, such as 0.2 to 4 wt %, especially 0.5 to 2 wt %. Levels of 1 wt %±0.5 wt % are particularly preferred. In the case of a hydrate these levels exclude any water associated with the salt. Where a mixture of zinc salts are used as Component (B), these levels refer to the combined level of zinc salts.

These levels of component (B) described above apply equally to the amount of zinc salt present in the kits of the invention. In the case of kits the amounts are also relative to the combined amounts of kit components (I), (II) and if present (III). For instance, in the case of the Examples described below, the primer is produced by combining approximately 44 wt % kit Component (I) and 56 wt % kit Component (II) (containing the water-soluble zinc salt). The zinc salt is present at a level of 1% by weight of the primer (Component (I)+Component (II)), and 1.8% by weight of kit Component (II).

As is described in subsequent sections, the kit Components (II) or (III) may include an anticorrosive pigment component (C), such as zinc, and may further contain a water insoluble zinc salt such as zinc oxide. For the avoidance of any doubt, these are not to be taken into account in determining the level of component (B).

Anticorrosive Pigment—Optional Component C

Depending on the end purpose of the primer composition, the primer compositions of the invention may also contain an anticorrosive pigment. In the case where the primer is a shop primer, the inclusion of an anticorrosive pigment is preferred.

When present, it is important that the anticorrosive pigment is not present with the sol component. That is, the anticorrosive pigment is not present in Component (I), but may be present in kit Component (II), e.g. along with component (B). Alternatively, the anticorrosive pigment may be included as a separate component of the kit (Component (III)). When present, component (C) is preferably only in kit Component (II) or (III) and not in both.

It is preferred if the anticorrosive pigment is based on zinc. The zinc used in the composition can be metallic zinc in the form of a powder or flakes, hollow spheres embedded with zinc on the surface, minerals embedded with zinc on the surface, and polymers embedded with zinc on the surface. Alternatively, the zinc can be surface-treated metallic zinc chemically inert to the aqueous environment. Preferably, the zinc has a mean particle size in the range of 0.5-20 microns, such as 1-15 microns, preferably 2-5 microns or 6-9 microns. In particular, the zinc is in the form of zinc powder, especially of the stated particle size ranges. The use of zinc dust as an anticorrosive pigment is well known and its use will be familiar to the person skilled in the art.

The content of anticorrosive pigment in the primer of the invention is 0 to 90 wt %, such as 15 to 45 wt %, such as 20 to 40 wt %. In dry weight terms, the anticorrosive pigment may represent 0 to 95 wt %, 10 to 90 wt %, such as 20 to 85 wt %, especially 20 to 80 wt % of the primer (dry weight basis).

Accelerator—Optional Component D

The water borne primers of the invention may also contain a mineral accelerator. When present, that accelerator is zinc oxide, zinc phosphate, calcium strontium zinc phosphosilicate, zirconium hydrogen phosphate, iron phosphide, calcium zirconate, barium zirconate, zirconium nitride, zinc titanate and iron (II) titanate.

Most especially, it is zinc oxide or zirconium hydrogen phosphate, or zinc phosphate.

Mixtures of accelerators can also be used. Other mineral compounds can also be present in combination with these two accelerators.

The accelerators above can also be combined with other materials such as metal acetates, metaphosphates, metal titanates, hexafluorzirconates, zirconates and phosphates. The cation is typically Al, Zr, Ba, Ca or Zn.

When present, the amount of accelerator in the compositions of the invention may be 0.5 to 20 wt %, such as 1 to 15 wt %, especially 2 to 15 wt %.

In dry weight terms, component (D) may form 1.5 to 30 dry wt %, such as 3 to 20 dry wt %.

The combination of zirconium hydrogen phosphate and zinc phosphate is a preferred option. The combination of zirconium hydrogen phosphate and zinc oxide is also preferred for component (D). The use of zinc oxide alone as the sole accelerator is the most preferred option.

Without wishing to be limited by theory it has been found that these specific accelerators further enhance the excellent drying times and rapid water resistance achieved by including the water-soluble zinc salt component (B).

Viewed from another aspect, the invention provides an aqueous primer as comprising:
(A) a polysiloxane sol;
(B) 0.1 to 10 wt % of a water-soluble zinc salt having a solubility in deionised water of at least 0.5 g/L at 25° C.;
(C) 15 to 45 wt % of at least one anticorrosive pigment; and
(D) 0.5 to 20 wt % of an accelerator selected from zinc oxide, zinc phosphate, calcium strontium zinc phosphosilicate, zirconium hydrogen phosphate, iron phosphide, calcium zirconate, barium zirconate, zirconium nitride, zinc titanate or iron (II) titanate or mixtures thereof.

Microspheres

The primer may also contain microspheres to improve the hardness and weldability of the coating. The term microsphere refers to an essentially spherical particle having a particle size D50 from 100 nm to 500 microns. All kinds of microspheres could be used such as those meeting at least one, such as all, of the specifications given in the table below:

|  | Possible | More preferred | Most preferred |
| --- | --- | --- | --- |
| Hardness (Mohs scale) | ≥5 | ≥6 | ≥7 |
| Crush strength (90% survival) | >5000 psi | >20,000 psi | >60,000 psi |

Particle size may be determined by e.g. laser diffraction analysis (Malvern).

Preferably, the spheres have a specific surface of <7000 cm$^2$/g, preferably <6000 cm$^2$/g, preferably <5000 cm$^2$/g (Blaine method EN196-6).

Preferred microspheres will meet all the requirements in the possible column, more preferred column or most preferred column. Microspheres are hard. The actual microspheres can be made of any suitable polymeric material, ceramic or glass. The microspheres are preferably ceramic or glass.

Exemplary ceramics include aluminates, titanates, zirconates, silicates, doped (e.g. lanthanide, and actinide doped) versions thereof, and combinations thereof.

Examples of commercially available ceramic microspheres include ceramic hollow microspheres marketed, for example, by Sphere One, Inc., Chattanooga, Tenn., under the trade name, "EXTENDOSPHERES" (e.g. grades SG, CG, TG, SF-IO, SF-12, SF-14, SLG, SL-90, SL-150, and XOL-200); and solid ceramic microspheres marketed, for example, by 3M Company under the trade name "3M CERAMIC MICROSPHERES" (e.g., grades G-200, G-400, G-600, W-210 and W-410, by Osthoff Omega Group as Omega-SIL, or Zeeospheres (e.g. G-series (G200, G400, G600) or N-series (N200, N400, N600)).

Examples of commercially available glass spheres include S38HS, S38XHS, K46, S60, S60HS, iM30K, iM16K by 3M, and hollow glass microspheres under the trade names Q-Cel and Sphericel by Potters Industries. Particle size (D50) of the microparticles is preferably 1-110 microns, more preferably 2-50 microns, especially 4-30 microns.

The effect of the microspheres is primarily to add hardness and abrasion resistance to the coating composition. Whilst there are alternative hardness improvers such as inorganic fillers, these ceramic microspheres have the additional benefit compared to the alternative hardness improvers that they give a large effect in comparatively small amounts.

It is preferred if the pH of the microspheres is in the range of 9 or less, preferably 8.5 or less (measured in a 10 wt % dispersion of the microspheres in deionised water). pH is preferably above 3. If the pH is >9 we have observed shortening of the shelf life of the paint.

Microspheres may form 0.5 to 10 wt % of the primer composition, such as 1 to 7 wt %, especially 2 to 7 wt %. In some embodiment there may be 0.5 to 5 wt % microspheres.

In dry weight terms, microspheres may form 0.5 to 15 dry wt %, such as 2 to 10 wt %.

In a preferred embodiment the microspheres are glass microspheres.

Other Constituents

The primer layer composition may also contain various other components, e.g. to enhance its anticorrosive properties and so on.

In particular, the primer layer composition may comprise extenders such as other metal oxides, metal carbonates, feldspar and so on to act as anti-corrosive materials. In particular, the primer layer composition may comprise extenders to act as welding enhancers. Suitable welding enhancers include titanium dioxide and fluorspar. It has been surprisingly found that these extenders improve the weldability of the coating. The primer containing these extenders suffers from fewer pores, less back burning and low levels of smoke and spatter.

When present, the extenders are preferably present in kit part (II), preferably only in kit part (II).

The primer composition as a whole may comprise 1 to 30 wt % of extender additives, e.g. titanium dioxide and fluorspar, such as 4 to 20 wt %. In dry weight terms, extenders may form 3-50 dry wt %, preferably 8-30 dry wt %, most preferably 12-25 dry wt % The use of titanium dioxide and fluorspar as extenders has been found to be of particular benefit as these materials, as opposed to talc, have been found to give non porous primer coatings without back burning, smoke and spatter. Shop primers of the invention preferably contain titanium dioxide.

Colour pigments might also be present, preferably inorganic pigments. Examples of the color pigments include titanium white, iron oxides, chrome oxides and carbon black.

As noted previously, the primers of the invention are designed to avoid the problems associated with certain waterborne silicate primers. It is therefore preferred if the primers of the invention contain no alkali metal silicates, such as lithium silicate, potassium silicate or sodium silicate.

It is also preferred if the primer is free of organic solvent.

Addition of one or more thickening agents/thixotropic agents in a ratio of 0.01-10% by wt, such as 0.01-5% by wt, preferably 0.05-2% by wt, of the (wet) composition improves the anti-settling properties, film formation and spraying properties of the primer. Examples of suitable thickening agents are bentonite, fumed/colloidal silica, natural thickeners (e.g. alginates), cellulosic thickeners, saccharides, and polysaccharides. When present, the thickening agents are preferably present in kit part (I), preferably only in kit part (I).

The primer of the invention may also contain other standard additives such as preservatives such as sodium benzoate and surface tension modifiers.

The water content of the primer when ready for application may range from 5 to 20 wt %.

Composition

In some embodiments of the invention the mixture of components (A), (B) and optionally (C) may have adequate storage stability that the primer can be supplied in pre-mixed form. This is especially the case when no anticorrosive pigment component (C) is included.

However, more commonly the primer composition of the invention is formed by mixing the various components shortly before the primer is applied to a substrate to avoid premature curing. The primer is therefore preferably supplied as a two or more component kit for mixing by the user.

Component (I) of such a kit contains the polysiloxane sol component (A) and optionally many of the additives that are conventionally present such as extenders, thickening agents, preservatives, welding enhancers and microspheres.

Component (II) comprises the water-soluble zinc salt (component (B)) and/or the anticorrosive pigment component (C) of the primer of the invention.

It is preferred if the composition of the invention (i.e. the mixed primer) has a VOC less than 100 g/L, preferably less than 50 g/L, most preferred below less 30, e.g. less than 15 g/L. In one embodiment, the primer of the invention is provided in aqueous form. In a second embodiment, the primer is provided with an amount of water but is designed to be thinned further before use.

The composition of the invention when applied preferably dries within 10 minutes at 23° C. 50% RH, preferably within 2 minutes following the test protocols set out in the tests section of the application.

Following the test protocol set out below, it is also preferred if the composition dries through and provides a mechanically abrasion resistant surface within 20 minutes at 23° C. 50% RH, preferably within 5 minutes.

The final primer of the invention is resistant to water.

In this regard, it is preferred if the primer has early water resistance, i.e. is water resistant within 24 hours, preferably 12 hours curing time at 23° C. 50% RH, preferably within 6 hours following the test protocols set out in the tests section of the application (stable water rub test).

The primers of the invention also have good humidity resistance. Primers according to the invention are considered to be "stable" if they exhibit a humidity resistance of at least 24 hours when measured according to the resistance to humidity test (ISO 6270-2:2005). Primers of the invention preferably have a stability resistance of at least 36 hours, especially at least 48 hours.

In one preferred embodiment the primer of the invention is a shop primer. It is important that the shop primer can be welded. The main purpose of the shop primer is to provide temporary corrosion resistance whilst all welding of parts takes place. The shop primers of the invention can be welded on with a speed of at least 70 cm/minute with MIG or similar welding technique producing less than 125 mm$^2$ pores each 1 meter weld. Moreover, welding should produce a minimum of weld spatter, weld smoke and back burning.

It is a final and important goal that the shop primer can be overcoated without any extra pre-treatment of the shop primer coat. It will be appreciated that any surface to be painted is cleaned before overcoating, e.g. to remove dust, salt and/or grease that have been acquired after shop primer application and prior to applying the next coat. That is not a pre-treatment step. In particular, the application of an epoxy primer is possible.

The pigment volume concentration (PVC) is an important parameter of the shop primer of the invention. The critical volume concentration is also important. PVC is the volume concentration of pigment. CPVC is the maximum volume concentration of pigment fully covered by the resin. PVC/CPVC>1 means that not all the pigments are covered with resin. The paint will be porous. The ratio is a balance between barrier protection and cathodic protection. Too high ratio results in other issues like popping and cohesion loss. Preferably PVC/CPVC is in the range of 0.8-1.2, more preferably 0.9-1.1, most preferably 0.95-1.05.

Kits

Primers of the invention are preferably supplied as a kit of at least two parts. A component (I) comprising the binder (A) and a component (II) comprising the water-soluble zinc salt (B) and/or the anticorrosive pigment (C).

The water-soluble zinc salt (B) may be provided in component (I) and/or component (II) of the binder, preferably component (II), especially preferably only in component (II).

If present, the anticorrosive pigment (C) may be provided as a third component (component (III)), but preferably is included as part of component (II) along with the water-soluble zinc salt (B).

In a less preferred embodiment the primers of the invention are supplied as a kit of two components: a first component (I) comprising the binder (A) and the water-soluble zinc salt (B) and a second component (II) comprising the anticorrosive pigment (C).

In a preferred embodiment the primers of the invention are supplied as a kit of two components: a first component (I) comprising the binder (A) and a second component (II) comprising the water-soluble zinc salt (B) and, if present, the anticorrosive pigment (C).

In another preferred embodiment the primers of the invention are supplied as a kit of three components: a first component (I) comprising the binder (A), a second component (II) comprising the water-soluble zinc salt (B) and a third component (III) comprising the anticorrosive pigment (C).

The components (I), (II), and when present (III), are mixed to form the primer composition shortly prior to applying the primer on a substrate. In the case of a three-component kit the order of addition is not critical. For instance, component (III) may be added to one or more of components (I) and (II) prior to combining components (I) and (II); or may be added at the same time as combining components (I) and (II); or may be added after combining components (I) and (II).

Applications

The composition of the invention is applicable by all types of application equipment, as brush and roller, conventional spray gun, airless spray and air-assisted airless spray. Ideally, the paint is applied by airless spray to give rise to a primer that spontaneously cures on application to the substrate.

The substrate to be coated is preferably a metal substrate, ideally a steel substrate. That substrate may be one that is used in a marine environment. Typical substrates therefore include parts of a ship, metallic containers like shipping containers, bridges and so on.

After final mixing, the primer is typically applied onto a steel surface ideally to a final thickness of 5-150 microns, such as 50-150 microns (dry film thickness (DFT) as measured according to the test methods section). Such a coating will provide a temporary protection to the steel surface. Where component (C) is absent, DFTs of 50-150 microns are preferred. In the case of a shop primer, the final thickness is preferably 5-50 microns, such as 15-25 microns.

This being said, the present invention also relates to a method for temporarily protecting a steel surface with an anti-corrosive coating, the method comprising coating the steel surface with a primer composition as defined herein.

The thus coated steel surfaces will typically be stored for 2-40 weeks such as up to around 6 months, where after the steel surfaces can be used in the manufacture of steel constructions where the coated steel surfaces are surfaces of steel body parts of which the steel construction is constituted. The steel construction is assembled by welding and importantly, the steel body parts coated with the composition according to the invention can readily be welded to provide high quality junctions between the steel body parts of the steel constructions.

Thus, the present invention also relates to a method for manufacturing a steel construction, said steel construction being constituted by a plurality of steel body parts, said method comprising the steps of:
a) coating at least one of the steel body parts with a primer composition according to claim 1;
b) storing the thus coated steel body part(s) for a period of 2-40 weeks;
c) assembling at least a part of the steel construction by welding together at least two of the steel body parts, at least one of said at least two steel body parts being coated as in step (a).

Further steps and details in the manufacturing of a steel construction will be obvious for the person skilled in the art.

The primer can be overcoated using any kind of paint without any pretreatment of the primer coat (other than to clean it to remove dust, grease etc).

The invention will now be described with reference to the following non limiting examples.

Test Procedures

Resistance to Humidity

The panels were tested at 100% humidity and 40° C. according to ISO 6270-2:2005. The panels were prepared by spray application (25 μm DFT) by conventional spray on SA2,5 blasted steel panels. The panels were placed into the climate chamber (constant atmosphere) and checked every day for two weeks. The panel was rubbed hard with a finger and the rubbed area was inspected visually. No paint should be visible on the finger after rubbing, and no damage should be seen on the paint film.

Stable Water Rub Test

The primer was thoroughly mixed and applied on sandblasted steel panels (7.5×15×3 mm) with a cleanliness of SA2.5 using an applicator with 30 μm gap. After 24 hours, the steel panels were placed in a container with water at 23° C. so that half of the panel was immersed. The panels were immersed for 5 minutes, before a standard water resistance test was performed; a clean woven cotton cloth soaked in water was rubbed back and forth (double rubs) with medium pressure (manual thumb pressure) 80 times. The coating and the cotton cloth were then evaluated before setting a water resistance value from 0 to 5, where 4 is regarded as water resistant, and 5 is completely water resistant, or fully cured. For a value of 4 the rubbed area has slight burnished appearance, and there is slight amount of zinc on cloth.

Stability Test

Component A was stored in a closed can at 60° C. along with the wt % of zinc salt added to the binder in the examples below. The content was checked at intervals (once a week). The paint was stirred by hand with a wooden stick and visually inspected. To pass, the paint should be without lumps, without significant color change and homogeneous.

Determination of Dry Film Thickness (DFT)

Dry film thickness is measured using an elcometer on a smooth steel substrate.

Determination of Solids Content of the Compositions

The solids content in the compositions are calculated in accordance with ASTM D5201.

Calculation of the Volatile Organic Compound (VOC) Content of the Coating Compositions The volatile organic compound (VOC) content of the coating compositions is calculated in accordance with ASTM D5201.

Volume of Solids Content of the Compositions

Volume solid measurement was made using OCCA Monograph no. 4.

EXAMPLES

Components
Bentone LT—thixotropic agent—Elementis Specialties
VPS SIVO 165—polysiloxane sol binder—Evonik
Bayferrox black 318 M—iron oxide pigment

TABLE 1

Test results.
Wt % are given for the combined composition. Binder percentages of VPS SIVO 165 are based on the weight of the actual polysiloxane sol (+any water of dilution present).

| Ingredient | Ref. | Ex. 1 | Ex. 2 | Ex. 3 | Ex. 4 |
|---|---|---|---|---|---|
| Component I | | | | | |
| Bentone LT | 0.23 | 0.23 | 0.23 | 0.23 | 0.23 |
| VPS SIVO 165 | 36.45 + 6.91 | 36.09 + 6.84 | 36.09 + 6.84 | 36.09 + 6.84 | 36.08 + 6.84 |
| Water of dilution | 6.91 | 6.84 | 6.84 | 6.84 | 6.83 |
| Component II | | | | | |
| Zinc dust | 28.62 | 28.34 | 28.34 | 28.34 | 28.34 |
| Zinc oxide RED SEAL | 5.59 | 5.54 | 5.54 | 5.54 | 5.54 |
| Bayferrox black 318 M | 10.07 | 9.97 | 9.97 | 9.97 | 9.97 |
| Zinc gluconate | | 1 | | | |
| Zinc citrate | | | 1 | | |
| Zinc chloride | | | | 1 | |
| Zinc acetate | | | | | 1 |
| TiO$_2$ | 11.84 | 11.73 | 11.73 | 11.73 | 11.73 |
| Sodium benzoate | 0.23 | 0.23 | 0.23 | 0.23 | 0.23 |
| Oxalic acid dihydrate | 0.07 | 0.07 | 0.07 | 0.07 | 0.07 |

TABLE 1-continued

Test results.
Wt % are given for the combined composition. Binder percentages
of VPS SIVO 165 are based on the weight of the actual
polysiloxane sol (+any water of dilution present).

| Ingredient | Ref. | Ex. 1 | Ex. 2 | Ex. 3 | Ex. 4 |
|---|---|---|---|---|---|
| Resistance to humidity | Dissolves within 6 hrs | Stable | Stable | Stable | Dissolves within 24 hrs |
| Stable Water rub test after 24 hours | 4 | 4 | 5 | 5 | 5 |
| Stability test | ok | ok | ok | Gelled after 2 months | ok |

The data show that zinc gluconate, zinc citrate, zinc chloride and zinc acetate provide the composition with a better balance of humidity resistance and stability (water rub test) than the reference example. Zinc gluconate, zinc citrate and zinc chloride provide particularly good humidity resistance. Zinc acetate provides better humidity performance than the reference example without a zinc salt.

The coating of Example 3 was stable when Zinc chloride was added as a separate component, i.e. when prepared from a 3-component kit.

Prolonged storage of zinc chloride in Component A in kit Component (I) led to gelling meaning that zinc chloride needs to be included as separate component. Additionally, $ZnCl_2$+Zn also lead to lump formation.

Comparative Example

Example 1 was repeated using Aluminium nitrate received from Sigma instead of Zn gluconate. It was found that the Aluminium nitrate did not dissolve well in the Sivo 165 leading to a composition with unacceptable pot life.

The invention claimed is:

1. An aqueous primer comprising:
   (A) a polysiloxane sol;
   (B) 0.1 to 30 wt %, relative to the weight of the aqueous primer as a whole, of a water-soluble zinc salt having a solubility in deionised water of at least 0.5 g/L at 25° C.; and
   (C) at least one anti-corrosive pigment.

2. The aqueous primer according to claim 1, wherein the at least one anticorrosive pigment (C) is present in an amount of up to 95 wt % relative to the weight of the aqueous primer as a whole.

3. The aqueous primer according to claim 1, wherein the polysiloxane sol is present in an amount of 1.0 to 20 wt % relative to the weight of the aqueous primer as a whole on a dry weight basis.

4. The aqueous primer according to claim 1, wherein the polysiloxane sol is present in an amount of 10 to 80 wt % relative to the weight of the aqueous primer as a whole.

5. The aqueous primer according to claim 1, wherein said water-soluble zinc salt is an organic zinc salt comprising zinc gluconate, zinc citrate, or mixtures thereof.

6. The aqueous primer composition of claim 1, wherein the composition is free of alkali metal silicate.

7. The aqueous primer composition of claim 1, wherein the at least one anti-corrosive pigment comprises zinc.

8. The aqueous primer composition of claim 1, wherein the composition further comprises an accelerant selected from the group consisting of zinc oxide, zinc phosphate, calcium strontium zinc phosphosilicate, zirconium hydrogen phosphate, iron phosphide, calcium zirconate, barium zirconate, zirconium nitride, zinc titanate, iron (II) titanate, and mixtures thereof.

9. An aqueous primer comprising:
   (A) a polysiloxane sol;
   (B) 0.1 to 30 wt %, relative to the weight of the aqueous primer as a whole, of a water-soluble zinc salt having a solubility in deionised water of at least 0.5 g/L at 25° C.;
   (C) 15 to 90 wt %, relative to the weight of the aqueous primer as a whole, of at least one anticorrosive pigment; and
   (D) 0.5 to 20 wt %, relative to the weight of the aqueous primer as a whole, of an accelerator selected from the group consisting of zinc oxide, zinc phosphate, calcium strontium zinc phosphosilicate, zirconium hydrogen phosphate, iron phosphide, calcium zirconate, barium zirconate, zirconium nitride, zinc titanate, iron (II) titanate, and mixtures thereof.

10. The aqueous primer composition of claim 1, wherein the composition comprises zinc oxide and/or titanium dioxide and/or fluorspar and/or microspheres.

11. The aqueous primer composition of claim 1, wherein the aqueous primer is a shop primer.

12. A kit comprising at least two parts;
   a first part (I) comprising component (A), wherein (A) comprises a polysiloxane sol; and
   a second part (II) comprising component (C), wherein component (C) comprises at least one anticorrosive pigment; and
   wherein component (B) comprises a water-soluble zinc salt having a solubility in deionized water of at least 0.5 g/L at 25° C., is present in at least one of parts (I) or (II); the water-soluble zinc salt being present in the kit in an amount of 0.1 to 30 wt % relative to the combined weight of parts (I) and (II) of the kit.

13. A process for protecting a substrate from corrosion comprising applying to that substrate the primer composition of claim 1 and allowing said primer composition to cure on said substrate.

14. A substrate coated with a cured primer, wherein the primer comprises the primer composition of claim 1.

15. The aqueous primer according to claim 1, wherein the at least one anticorrosive pigment (C) is present in an amount of 15 to 45 wt % relative to the weight of the aqueous primer as a whole.

16. The aqueous primer according to claim 1, wherein the polysiloxane sol is present in an amount of 25 to 70 wt % relative to the weight of the aqueous primer as a whole.

17. The aqueous primer composition of claim 1, wherein the at least one anti-corrosive pigment consists essentially of zinc.

18. The kit of claim 12, wherein component (B) is present only in one of parts (I) or (II).

19. The kit of claim 12, wherein component (B) is present in part (II).

* * * * *